United States Patent [19]

Davis

[11] Patent Number: 5,363,594
[45] Date of Patent: Nov. 15, 1994

[54] VERTICAL GARDENS
[75] Inventor: Kenneth W. Davis, Mtn View, Wyo.
[73] Assignee: A.C.T. Inc., Salt Lake City, Utah
[21] Appl. No.: 788,944
[22] Filed: Nov. 7, 1991
[51] Int. Cl.⁵ ............................................. A01G 25/00
[52] U.S. Cl. ............................................ 47/82; 47/83
[58] Field of Search ........................... 47/82, 83, 59, 62

[56] References Cited
U.S. PATENT DOCUMENTS

| | | | |
|---|---|---|---|
| 4,380,136 | 4/1983 | Karpisek | 47/83 |
| 4,920,695 | 5/1990 | Garden | 47/83 |
| 4,986,027 | 1/1991 | Harvey | 47/83 |
| 5,031,359 | 7/1991 | Moffett, Jr. | 47/82 |

FOREIGN PATENT DOCUMENTS

| | | | |
|---|---|---|---|
| 2730279 | 1/1979 | Germany | 47/82 |
| 2149282 | 6/1985 | United Kingdom | 47/82 |

*Primary Examiner*—Ramon S. Britts
*Assistant Examiner*—Joanne C. Downs

[57] ABSTRACT

Vertical Gardens is a garden structure disclosed for producing a vertically oriented garden. It comprises a series of vertical, self contained, individual plant or crop growing containers, with growing orifices located on the exterior of a hexagonal shaped stock, with a hollow bore in the center containing a soilless, organic growth medium. The growing orifices are separated by a series of aeration holes. The plants or crop roots are inserted into the bore through the growth orifices and imbedded in the organic growth medium. An irrigation system of water and nutrients mixture, flows down through the organic growth material, and recycled. The growth containers function to supply controlled air, water, nutrients and minerals and as a support to encourage vertical growth of harvest products.

The individual growth containers, mounted in series, are anchored in an enclosed common base reservoir which is the source of supply and transport of water and nutrients to the plant roots. The number of growth containers, installed in series, is determined by the harvest desired and the growing space available. By combining the number of individual vertical growth containers in a single reservoir base with a single pump and irrigation system encourages economic growth and harvest.

1 Claim, 10 Drawing Sheets

VERTICAL GARDENS

BACKGROUND OF INVENTION

"Vertical Garden"

The invention relates generally to garden structures and more specifically to an improved simplified vertical garden structure and method of producing same.

Garden structures for providing vertical gardens are generally well known in this art of which U.S. Pat. Nos. 4,213,174; 4,117,688; 4,100,699 and 3,961,444 are exemplar. The patents listed describe growing methods wherein suitable amounts of air and moisture are combined to promote optimum growth of the plants. This invention can be distinguished from the others in that those methods are expanded by combining the air, water and nutrients to feed the growth plants hydroponically.

Karpisek, U.S. Pat. Co. 4,380,136, issued on Apr. 13, 1983, describes a garden structure which comprises an assembly kit for a holder for growth supporting medium. It is distinguishable from the present application in that the purpose of Karpisek is to provide a holder for plants which does not provide a self contained growth material nor include a recycling irrigation system and a nutrient and water source.

U.S. Pat. No. 4,986,027 (Harvey-1/1991) is of interest in disclosing a vertical garden structure suspended from the ceiling. This invention can be distinguished from the present Application in several particulars. (1) The present Application garden structure is self-contained and automated, while Harvey requires hand operation for fertilizing and irrigation. (2) The Harvey garden structure is built to be used in the home, while the present Application is constructed to harvest crops on a commercial basis. (3) The growth material, into which the plants are inserted, in the Harvey invention, consists of items such as styrofoam beads and polypropylene fabric, while the present Application employs a completely organic, soilless, biodegradable mulch-like material, which, together with the organic hemp bag, which functions as a natural fertilizer source as it disintegrates. (4) The garden structure of Harvey, built for hanging in the home, limits the growth in a supposed vertical manner, while the present Application encourages vertical growth which more effectively makes maximum use of minimum growing space. (5) The Harvey garden structure is constructed to be movable within a home, however, the present application garden structure is constructed to be portable from area to area.

The invention features an improved vertical structure, consisting of multiple growth containers containing a soilless organic growth medium, which provides a proper air, water and nutrients mixture for irrigation of the plants growth in a vertical attitude. The mixture combined with aeration fertilizes the plants and creates vigorous plant growth.

SUMMARY OF INVENTION

The main objective of the embodiments is to provide a vertical garden which enhances the growth of vertical growth oriented plants, in a series of connected individual vertical growth containers, by controlling the supply of water, air and nutrients, to encourage vertical growth in a very limited space, economically.

A major objective is to install individual vertical growth units, in a series, i.e., multiple units, the number to be determined by the amount of growing space, illustrated by FIGS. 1, 2 and 3, and provide irrigation enhancement for crops or harvest, for vertical growth in a limited space.

Control of the air and water supply, mixed with nutrients, creates a favorable atmosphere under which a variety of plants or crops may be grown simultaneously in one or more vertical growing units.

Main objectives include providing a vertical growth unit that is economically easy to assemble, plant and maintain. Because of the simplicity of manufacture and easy maintenance, the units are easily stored, if used for seasonable planting, and are easily assembled for shipment to users.

Another objective is to provide a growing unit which is inexpensive, assembled out of mechanical parts, i.e., pump, float, etc., readily available in any retail market which assures the continued availability of suitable parts in event of repair or replacement. At each stage of development, the selection of materials included consideration of maintained efficiency, and, secondly, to create a devise which could be economically affordable to operate by any user, in addition to the economy of the amount of harvest resulting as compared to the minimum cost of operation.

A valuable benefit of the cost of the operation and the resulting minimum cost of harvest, is readily discernable when the cost of the limited space is compared to the cost of planting farmland and the cost of the planting and harvesting machinery and equipment.

To provide a planting system for use of a organic, soilless growth material as a plant holding system with enhanced irrigation providing a proper mixture of water, air, minerals and nutrients, the use of which minimizes the risk usually inherent in soil, such as insects, rot, etc. Such planting does not require any spraying to avoid such infestations.

Further, the placement of multiple growth containers, in a series, is structurally capable of allowing transportation of the unit by placing it on coasters in order to make a better or more economical use of a limited growth area.

DESCRIPTION OF ILLUSTRATION DRAWINGS

FIG. 1: is a frontal view of the principal embodiment which shows multiple individual vertical growth containers, anchored in series, in a common enclosed reservoir base, indicating the bearing supports and brackets and the external irrigation system.

FIG. 2: is a perspective top view of FIG. 1, which demonstrates the irrigation gravity flow drip feeder lines, the water emitter and individual vertical growth containers anchored in an enclosed base containing a reservoir for Unit 101.

FIG. 3: is a perspective frontal view illustrating multiple anchored individual vertical growth containers.

FIG. 4: is an enlarged perspective view of the top of the individual vertical growth container, the bore, burlap bag and the organic soilless growth medium.

FIG. 5: is a section view, taken at "a—a", as identified in FIG. 3, to illustrate the hexagonal structure of the individual vertical growth container.

FIG. 6: is an enlarged perspective view of the bottom portion of the vertical growth container, anchored in the enclosed support base and reservoir and the top portion of the vertical growth container, with portions cut away, illustrating the bore and contained organic soilless growth medium.

FIG. 7: is a cut away view of the inside of the individual vertical growth container (FIG. 3) to demonstrate location of the plant roots imbedded in the soilless organic growth medium, through the planting orifices on the exterior surfaces of the hexagonal vertical growth container.

FIG. 8: is an enlarged perspective view of the water emitter, connected to the individual feeder lines as irrigation conduits, with nozzle and filter screen.

FIG. 9A-F: consists of six boxed drawings which illustrate, step by step, the method of planting harvest crops or plants, in the individual vertical growth containers.

FIG. 10: an external frontal view of the secondary embodiment consisting of an individual vertical growth container as Unit 102, with the individual base support attached.

FIG. 11: an illustration of the secondary embodiment individual vertical growth container, when in use and during the plant growth and development stage.

FIG. 12: is a perspective top view of Unit 102 individual vertical growth container, illustrating the bore and burlap bag containing the organic soilless growth medium and the vertical conduit and water emitter.

DESCRIPTION OF PREFERRED EMBODIMENTS

Figure 1:
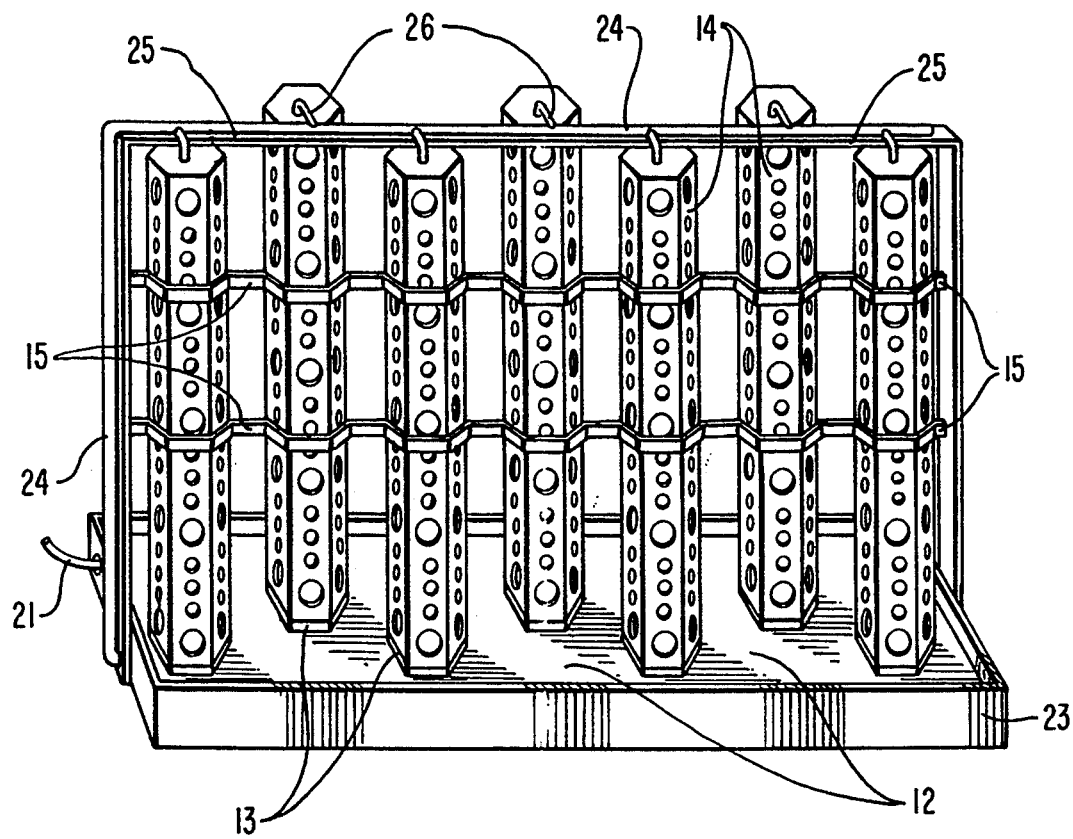
Figure 2:
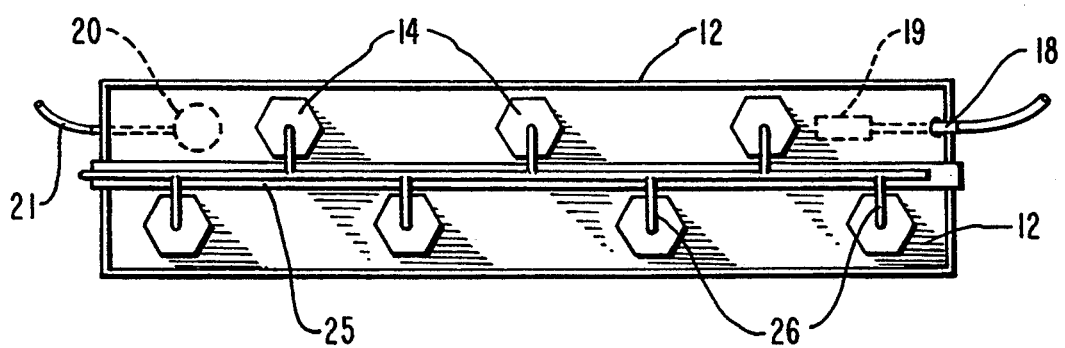
Figure 3:
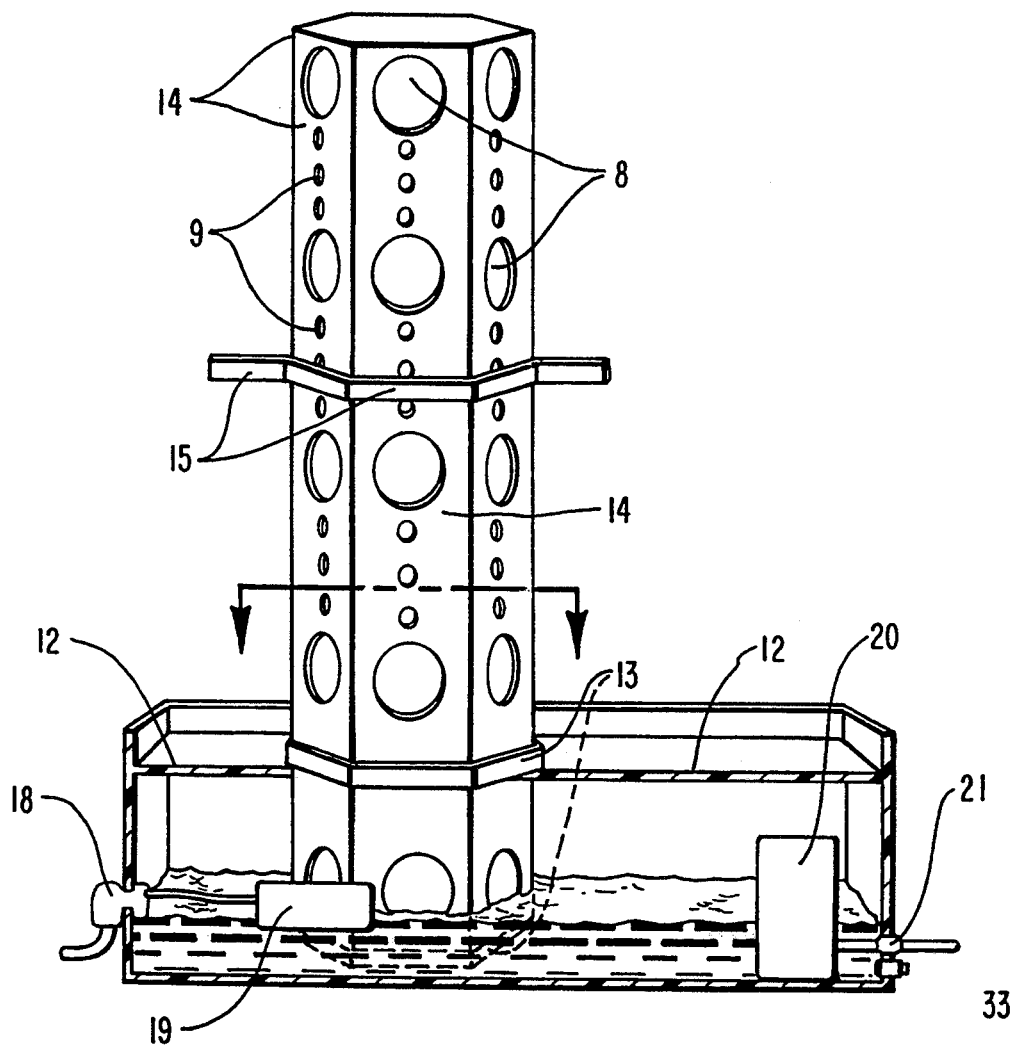

The individual vertical growth container in its complete form, is FIG. 3 of illustrations.

For purposes of identification and illustration, each integral part is identified by number, and each number is shown on the attached illustrations, FIGS. 1 to 12 inclusive, which illustration are included as part hereof.

The garden structure is disclosed for providing a vertically oriented garden and is adapted to commercial growth by combining from one to an unlimited number of individual growth containers 14, anchored in series, in a common enclosed reservoir base 12. (FIGS. 1, 2 and 3) The individual vertical growth containers 14, are hexagonal containers illustrated by FIGS. 1, 2, 3, 4, 5 and 6, mounted in a multiple series, illustrated in FIGS. 1, 2 and 3.

Figure 4:
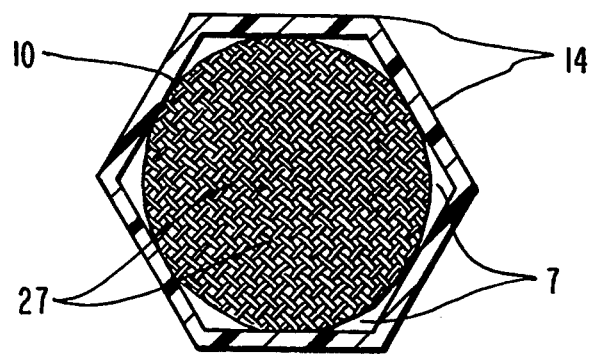
Figures 5, 6:
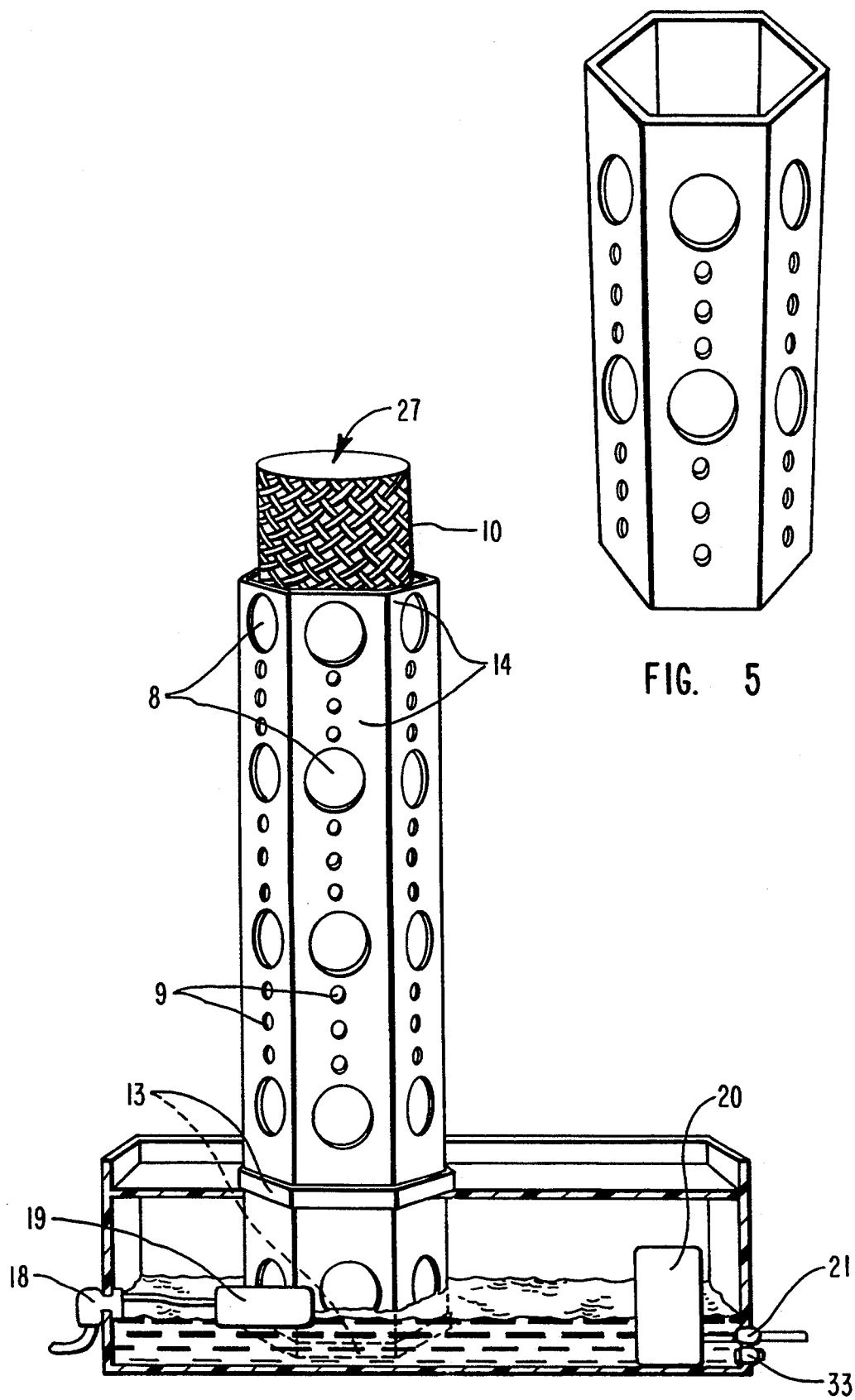
Figure 7:
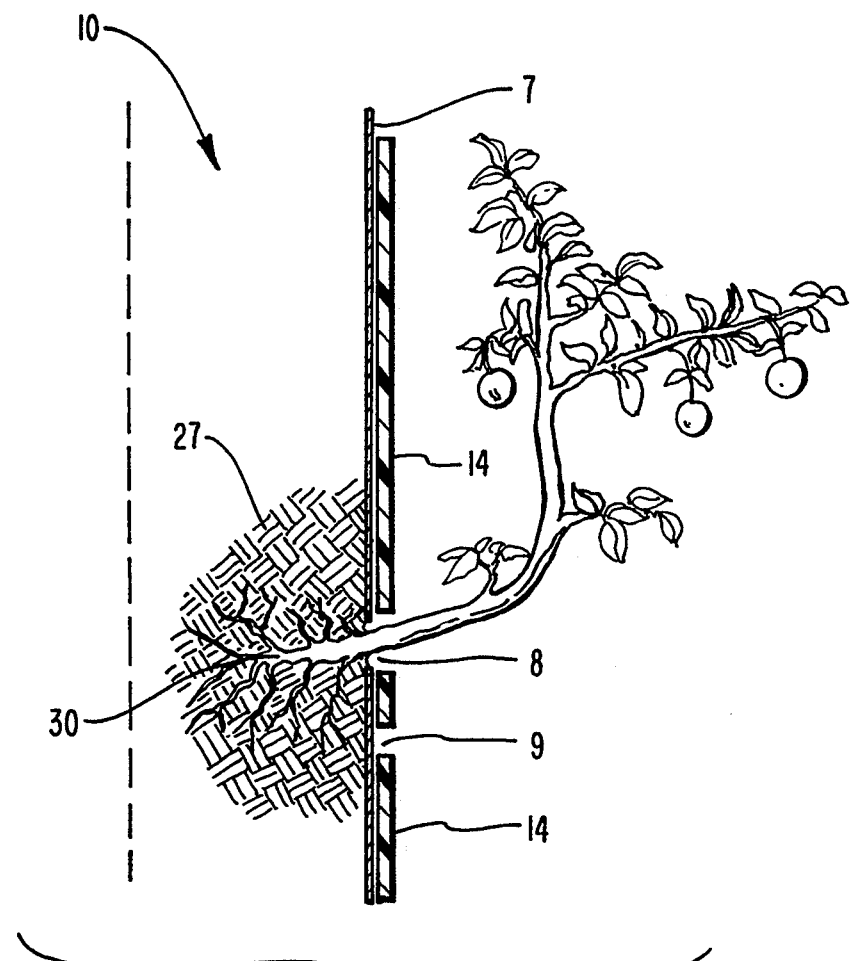
Figure 8:
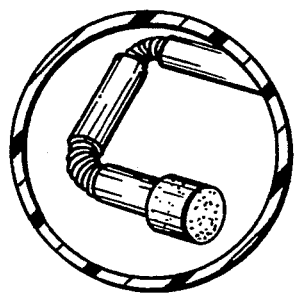
Figure 9A:
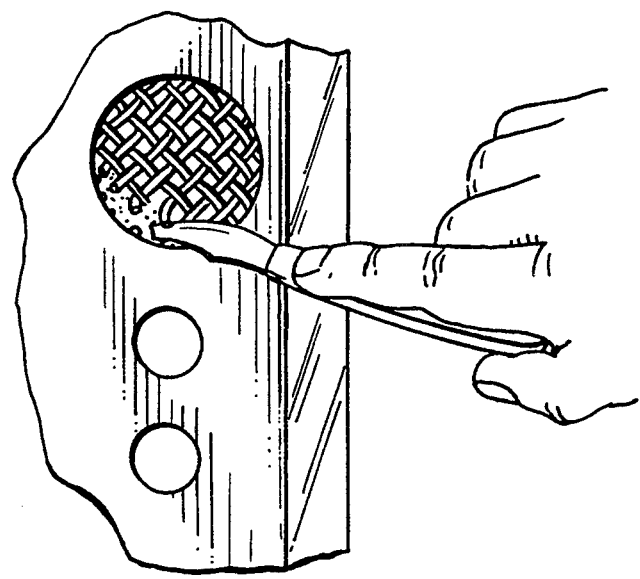
Figure 9B:
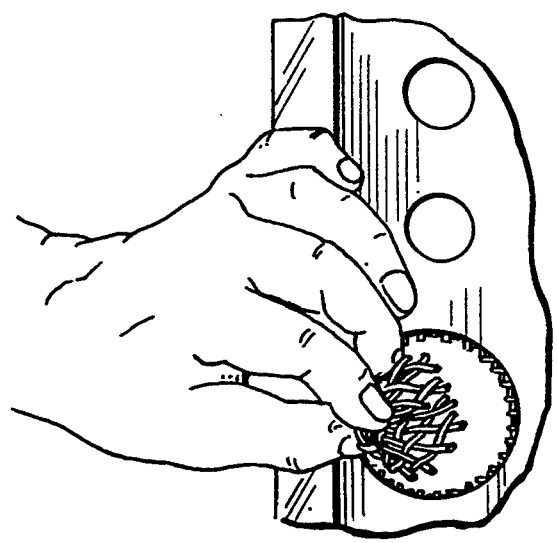
Figure 9C:
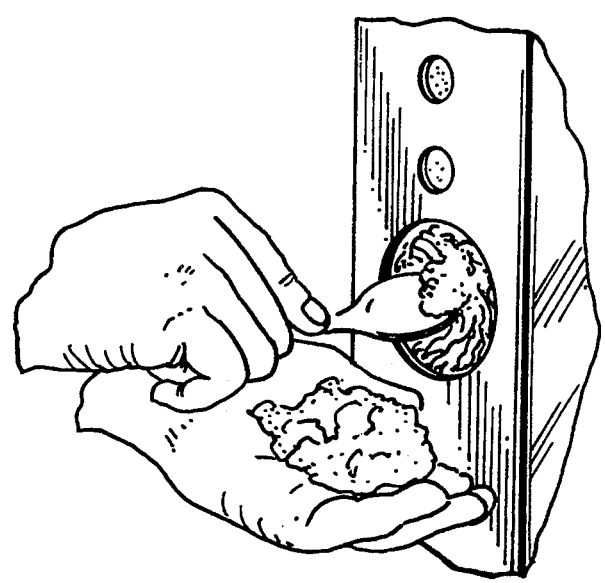
Figure 9D:
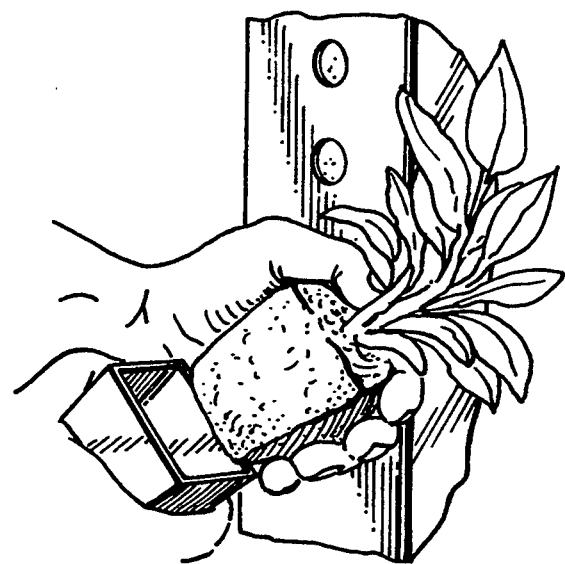
Figure 9E:
Figure 9F:
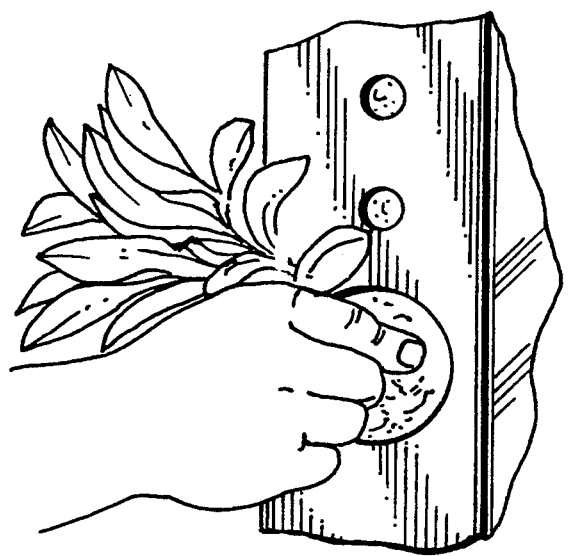
Figure 10:
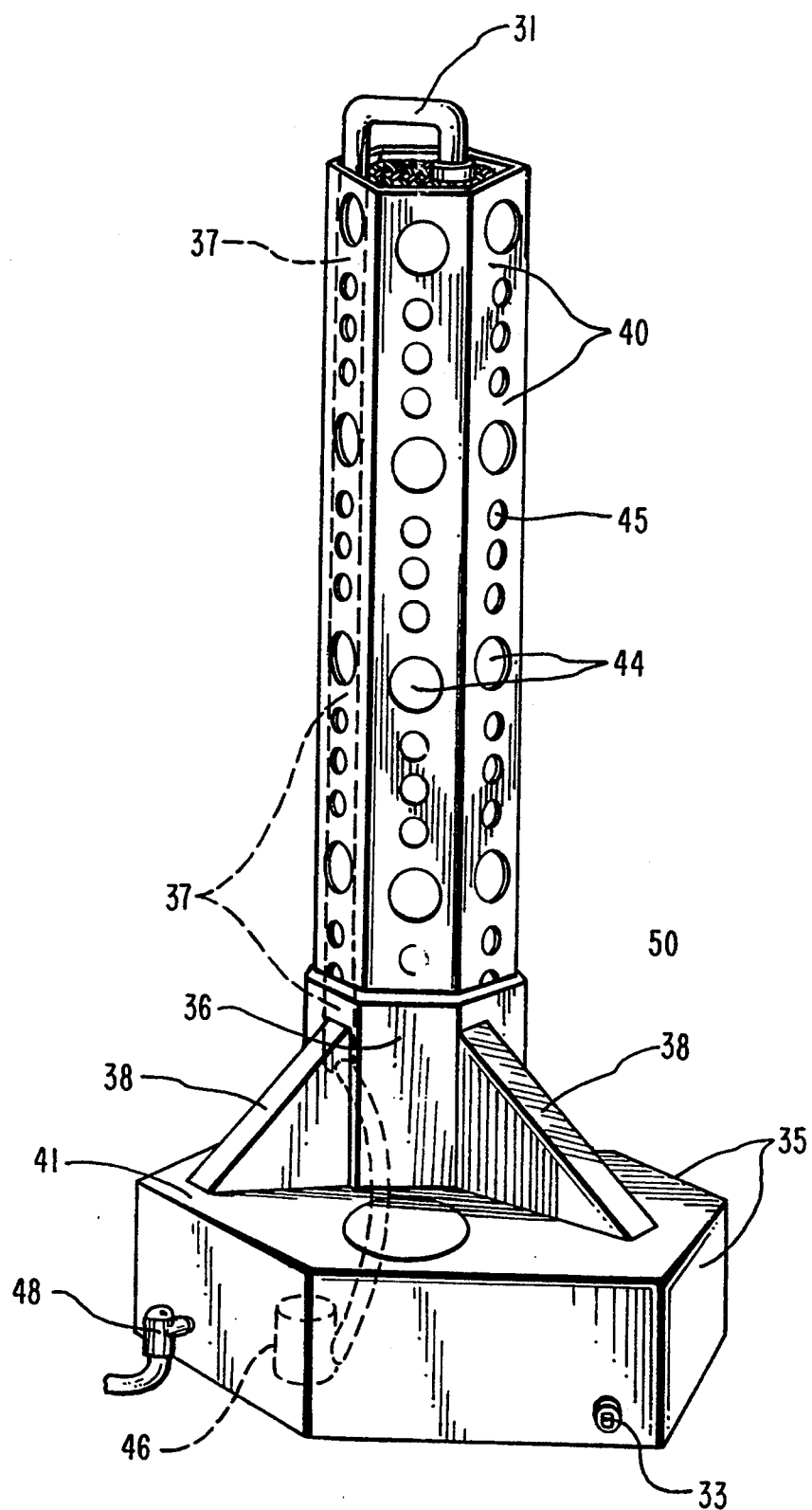
Figure 11:
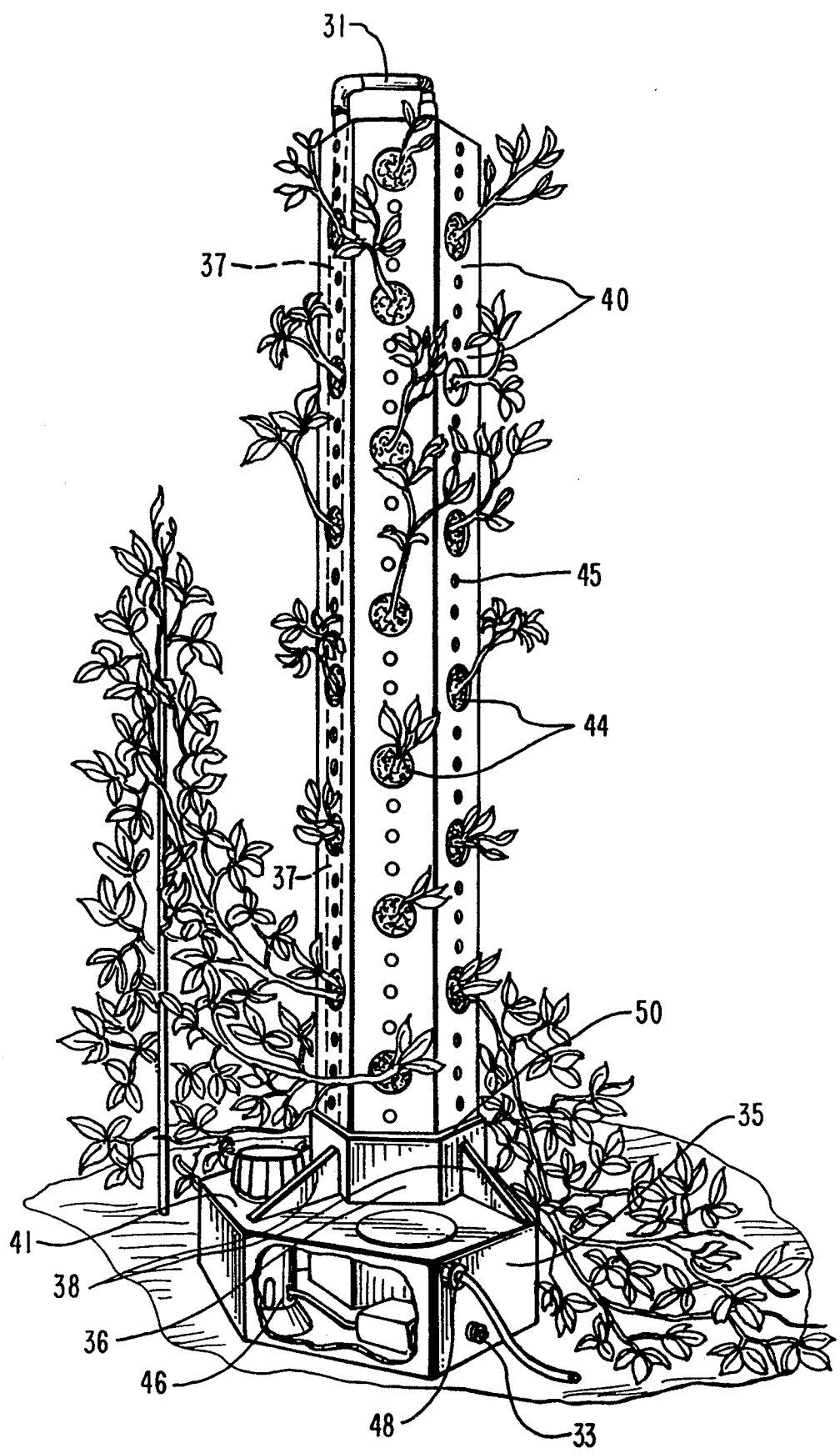
Figure 12:
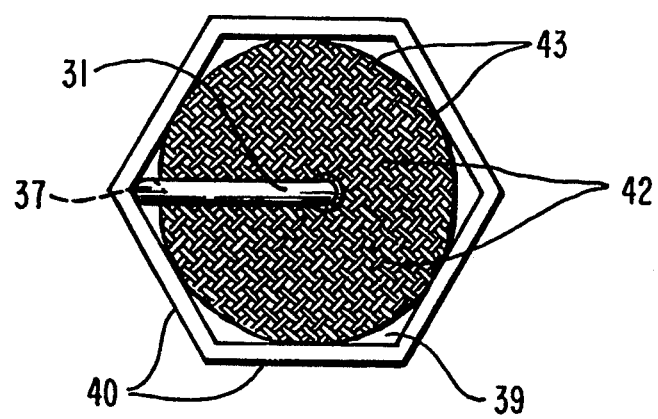

Each individual vertical growing container 14, is a hexagonal shaped vertical growing unit (FIGS. 1 and 3), which contains a bore 7, planting orifices 8, aeration holes 9 and an organic soilless growth medium 27, contained in a burlap bag 10, inserted into the bore 7 (FIGS. 4 and 6). Those parts are assembled in the growth containers 14 and secured by collars 13, in a multiple series spacing in an enclosed base containing a reservoir 12, FIGS. 1, 2 and 3)

The enclosed base reservoir structure 23, is elongated to allow multiple series of growth containers 14, to be mounted in the same base 23. Receptacles are provided at the top of the base 23, to permit the lower ends 16 of the growth containers 14, to pass downwardly into the enclosed base 23, and collars 13 are provided at the receptacles 16, to anchor the vertical growth containers 14. Support structure or brackets 15, support the upper portions of the growth containers 14 to stabilize the upper portions of the growth containers 14. The enclosed base structure 23, consists of a single water reservoir 12, a single supply outlet 18, a float valve 19, one water pump 20, with a connecting electrical power cord 21. The pump 20, supplies a main irrigation conduit line 24, which transport the water and nutrient supply upward outside the reservoir 12, and extends above and into a horizontal feeder line 25, with branch feeder lines 26, through the water emitter 31, and nozzle with a filter screen 32 to each growth container 14. The water supply, with nutrient mixture, is fed downwardly from the water emitter 31, through the soilless growth medium 27, by means of a gravity forced water dripping system. The water/nutrient mixture flows downward through the soilless growth medium 27, feeding the roots of the plants 30, which were planted (FIG. 9) through the planting orifices 8. The system supplies a controlled amount of enhanced solution of water and nutrients, to encourage the vertical growth.

Located in the end of the reservoir 12, opposite to the end of the water supply source outlet 18, is a drain and a drain plug 33. The drain plug 33 is a screw-in plug, which can be removed to drain the reservoir 12, for cleaning purposes or for the convenience of repair.

From this detailed description of the invention, it should be understood that it is fully capable of providing the advantages and fulfilling the objectives heretofore attributed to it. It should be further understood that the above description of the invention is not intended to limit nor restrict the invention to the dimensions, shapes or quantities described as specifically stated herein for demonstration and illustration purposes. One of the values of the invention is its flexibility to accommodate numerous plants, crops and harvest in a vertical orientation in a limited growth space.

FIGS. 3, 4, 5 and 6 illustrate the individual growing container, 14.

The individual growth container, the principal component of the principal embodiment, consists of an elongated, hexagonal, vertically extended container, 14, approximately six (6) inches in diameter, which extends four (4) feet above the top of the enclosed base 23, with it's lower end 16 secured by collars 13 into the base structure 23, which contains an enclosed water reservoir 12.

The vertically extended container 14, has six peripheral flat surfaces (FIGS. 3, 4 and 5). The six sided hexagonal shape was selected because the six flat surfaces better accommodate the placement of growing orifices 8 for planting and aeration holes 9, for air intake and circulation, and allows more planting area in keeping with the basic theory of maximum vertical growth in a limited growing area. However, the shape is optional, it could be square, round, octagonal or any other suitable shape.

The recommended height of the vertical growth container 14, is four feet above the top of the base, but it can be increased to six feet for added growth area if desired. If extended past four feet, the only adjustment needed, in addition to extending the growth container itself, would be the addition of additional brackets or support structures 15, which need be added to maintain the growth container extension in a stabilized vertical position.

The vertical growth container 14 is mounted at it's lower end into the base reservoir structure 17, and anchored in place with collars 13, at the receptacles 16. The collar 13 has an equal sized bore, just slightly larger that the outside perimeter of the container 14, so that the container 14 fits snugly into the collar 13.

The base structure 23, is an elongated enclosed box-like shape, manufactured from a material which has the same properties as poly vinyl chloride (pvc) large enough to accommodate the desired number of vertical growth containers 14, (FIG. 1, for illustration purposes, shows seven individual units) and needs to be of a sufficient width, height and depth to accommodate the desired number of vertical growth containers 14. The reservoir 12, is enclosed and the base is manufactured out of a material with similar properties to Poly Vinyl Chloride (pvc), which is a readily available material and has water resistent reservoir qualities which also maintains its rigidity. The base structure 23, contains an enclosed reservoir 12 for water into which the nutrients mixture is added, for feeding the growth crops. The reservoir 12, has sufficient capacity to irrigate the plant life in the vertical container 14. Water is supplied into the reservoir 12 from an outside single source 18 and the flow is controlled by a float valve 19, a pump 20 for circulation and irrigation, with an outside electrical power connecting cord 21.

The elongated vertical growth container 14, has six flat peripheral surfaces, containing approximately thirty six (36) planting orifices 8, 2½ inches in diameter, and a series of three (3) smaller aeration holes 9, spaced between each planting orifice 8, totaling approximately ninety (90) aeration holes, to provide the circulation of air to the plant roots 30. Inside the vertical growth container 14 is a bore 7, round in shape which fits snugly into the growth container 14 (FIG. 4) and contains a burlap bag 10, the approximate inside dimensions of the bore 7. The bore 7, holds the burlap bag 10 containing the soilless organic growth medium 27 into which the plant roots 30 (FIG. 7) penetrate (FIG. 9) through the planting orifices 8, into the bore 7, and lodged on the soilless growth medium 27, and anchors the roots 30, in a vertical planting mode, which allows plant growth out through the orifices 8 and on the exterior of the individual vertical growth container 14. The roots 30 are anchored in the soilless growth medium 27, through which the water and nutrient mixture is supplied.

The plants or roots are inserted through the planting orifices 8, one at a time, by first cutting away a portion of the burlap bag 10 which covers the orifice openings 8, and forms a planting pocket in the exposed soilless growth medium, (FIG. 7) contained in the bore.

The six suggested steps for preparing the individual plants for placement through the planting orifices 8 into the bore 7 and the burlap bag 10, containing the organic, soilless growth medium 27, are outlined and illustrated, step by step, in FIG. 9.

The water source for irrigation is provided from an outside source 18 and maintained in a single enclosed reservoir 12, controlled by a float valve 19, a single water pump 20, operated by and outside electrical power source 21. The water reservoir 12 can be filled to the level controlled by the float valve 19 and the pump 20 operated by electrical power to start the water, with nutrient mixture, through the irrigation conduit 24. If desired, the electricity to the pump may be controlled by a timer devise. When the water mixture completes the irrigation of plants by a drip flow, down through the organic growth medium, it empties into the reservoir, recaptured and recycled.

With a predetermined mixture of nutrients in the water placed in the reservoir 12, the pump 20 forces the mixture into a main irrigation conduit 24, which passes upward outside the reservoir 12 and extends up to the superstructure, above the individual containers 14 and into the horizontal feeder line 25 and through branch feeder lines 26 into the water emitter 31 (FIG. 8) nozzle and filter screen 32. The water and nutrient mixture flows into the feeder lines 26, out of the water emitter 31 and drips down into the top of the bore 7, of the vertical growth containers 14, into the burlap bag 10, which contains the soilless growth medium 27 and roots 30, and by means of gravity drawn water dripping system from the water emitter 31, which penetrates the organic growth medium 27, feeding the plant roots 30, to encourage vertical growth. The theory of growth enhancement through the use of an enriched solution is compatible with and encourages vertical growth when used in conjunction with the vertical growth containers 14.

An important economic feature of the vertical garden structure is that when the water is fed from the outside source 18, completes the irrigation downwardly through the growth medium 27 in the individual vertical growth containers 14, it empties into the common reservoir 12, recaptured and recycled.

The burlap bag 10 is inserted in the bore 7 to hold the soilless growth medium 27, and anchor the plant roots 30 is constructed from regular burlap material, which is readily available on any market. That material was selected to hold the organic growth medium 27 because of its strong construction, porous consistency and capability of holding both the growth medium 27 and plant roots 30 in place during the irrigation phase as well as plant growth and development in a vertical growth mode.

The plant growth medium 27 is a mixture of soilless organic products mixed in the form of peat moss, the contents of which are available at commercial markets, and will vary in composition from time to time. The principal of using such a compound is, first, it is compatible with the water nutrient mixture to encourage vertical growth, and secondly, it eliminates the problems of infestation of the medium or rot inherent with planting in regular soil such as found on farms.

Second Embodiment

The primary embodiment of multiple incorporated vertical growth containers of Unit 101, has an included or secondary embodiment. The same basic theories of planting, feeding and irrigating plants in a vertical growth mode is applied; however, only a single vertical growth container is used in a single support base. The secondary use unit designation is Unit 102, FIGS. 10, 11 and 12.

The major component of the multiple vertical growth apparatus, Unit 101, is the individual vertical growth container (FIGS. 1, 2 and 3) which is used separately, as an independent, self contained vertical growth unit. The component, the individual vertical growth container is independently described and illustrated by FIGS. 10, 11 and 12.

To adapt the apparatus to a such secondary use, requires inserting the lower end of the vertical growth container 40 into a support sleeve 36, anchored in place by a collar 50 and placed into an enclosed support base 35, with support braces 38, to maintain the vertical attitude of the growth container 40. The enclosed support base 35, contains a single water and nutrients mixture reservoir 41, and a single pump 46, which pumps the irrigating mixture into a vertical irrigation conduit 37, up through the bore 39, into the water emitter 31 (FIG. 8) which allows the water to drip flow downwardly through the plant medium 42, feeding the plant roots 47, and empties into the base 35, where it is recaptured and recycled.

The individual growth container 40, maintains the same hexagonal shape (FIGS. 4 and 4) and contains a bore 39, planting orifices 44 on the flat exterior hexagonal sides of the growth container 40. Aeration holes 45, in series, separate the growing orifices 44 for air circulation. An elongated burlap bag 43 is inserted in the bore 39, holding a organic soilless growth medium 42, into which the plant roots 47 are imbedded through the planting orifices 44, Also FIG. 7. The irrigation system for the individual vertical; growth container 40 is provided from an outside water source 48, fed into an enclosed base 35, which includes an enclosed reservoir 41, where the water is mixed with nutrients and pumped by a water pump 46 into and up through the vertical irrigation conduit 37, located inside the bore 39, to the top of the vertical growth container 40 and into the water emitter 31 and nozzle and screen 32. The water emitter 31 feeds the water/nutrient mixture down into the burlap bag 43, inside the bore 39 which contains the organic growth medium 42 and feeds the plant roots 47 by a forced gravity downward dripping system which empties into the reservoir 41 to be recycled. A drain plug 33 is inserted into the support base 35 for draining or cleaning the unit.

The lower end of the individual hexagonal growth container 40 is inserted into a similarly shaped, but slightly larger support sleeve 36, to assure a snug fit, which is held in place by a collar 50. Support braces 38 are attached to the sides of the sleeve 36 and anchored into the support base 35 to support and maintain the vertical rigidity of the individual vertical growth container 40. An outside electric power source connecting cord 48, is interconnected to the pump 46. The size of the pump 46, is smaller for the individual unit 102 than that required for the multiple unit 101.

The individual vertical growth container 40 of unit 102 is constructed with the same construction materials as Unit 101. The vertical growth container 40 is constructed out of Poly Vinyl Chloride (pvc) to maintain the rigidity and support capabilities and encourage vertical growth. For the Unit 102, the enclosed base 35, the support sleeve 36 and the support braces 38, are cast in a one-piece mold of Poly Vinyl Chloride and the additional five foot vertical irrigation conduit 37 will also be constructed from the same (pvc) material.

I claim:

1. A vertical plant, flower and vegetable growing garden structure, comprising:

an elongated, vertically disposed growth container formed of a relatively rigid material and being hexagonal-shaped in cross-section, said growth container having an internal bore containing a burlap bag with an organic, soilless growing medium being disposed within said bag, said growth container having a plurality of vertically extending, external flat surfaces, said flat surfaces having a plurality of perforations therethrough defining planting orifices through which roots of plants, flowers and vegetables are inserted, said planting orifices being separated by a plurality of aeration holes which are smaller than said planting orifices, an enclosed base including a reservoir for holding a water, nutrients and mineral mixture, said growth container being anchored to said enclosed base, and means for supplying said water, nutrients and mineral mixture to said soilless growing medium comprising a pump connected to an irrigation conduit which delivers the mixture at the top of the growth container through a water emitter.

* * * * *